United States Patent
Teglia

(10) Patent No.: US 7,533,412 B2
(45) Date of Patent: May 12, 2009

(54) PROCESSOR SECURED AGAINST TRAPS

(75) Inventor: Yannick Teglia, Marseilles (FR)

(73) Assignee: STMicroelectronics S.A., Montrouge (FR)

( * ) Notice: Subject to any disclaimer, the term of this patent is extended or adjusted under 35 U.S.C. 154(b) by 682 days.

(21) Appl. No.: 10/418,523

(22) Filed: Apr. 18, 2003

(65) Prior Publication Data

US 2004/0098608 A1      May 20, 2004

(30) Foreign Application Priority Data

Apr. 23, 2002   (FR)   .................................... 02 05069

(51) Int. Cl.
*G06F 12/14* (2006.01)
*H04L 9/00* (2006.01)

(52) U.S. Cl. ........................................ 726/22; 713/176
(58) Field of Classification Search ........................ None
See application file for complete search history.

(56) References Cited

U.S. PATENT DOCUMENTS

| | | | |
|---|---|---|---|
| 4,251,885 A | 2/1981 | Dodt et al. | |
| 4,493,078 A * | 1/1985 | Daniels | ........................ 714/732 |
| 4,513,174 A | 4/1985 | Herman | |
| 4,920,538 A | 4/1990 | Chan et al. | |
| 6,959,384 B1 * | 10/2005 | Serret-Avila | ................. 713/176 |
| 2004/0019781 A1 * | 1/2004 | Chari et al. | ................... 713/153 |

FOREIGN PATENT DOCUMENTS

WO   WO 00/54155 A1   9/2000
WO   WO 01/97010 A2   12/2001

* cited by examiner

*Primary Examiner*—Brandon S Hoffman
(74) *Attorney, Agent, or Firm*—Lisa K. Jorgenson; James H. Morris; Wolf, Greenfield & Sacks, P.C.

(57) ABSTRACT

A method for controlling the execution of a program including of associating with each operator an initial digital code and a final digital code which are linked to each other by a degradation function applied a number of times depending on the execution of this operator; applying, to the content of a register initialized at each instruction beginning by the initial code of the corresponding operator, said degradation function a number of times depending on the operator execution; and checking, at least at each instruction end, the coherence between the register content and the final code of the corresponding operator.

10 Claims, 2 Drawing Sheets

| OP1 | IN1 | FI1 |
|---|---|---|
| OP2 | IN2 | FI2 |
| OPi | INi | FIi |
| OPN | INN | FIN |

| PgLine | OPCode | CyNb | OPENb | OPE |
|---|---|---|---|---|
| INST1 | OPi | $k_i$ | SAi | OPE1 |
| INST2 | OPi | $k_i$ | SAi | OPE2 |
| INSTj | OPi | $k_i$ | SAi | OPEj |
| INSTM | OPi | $k_i$ | SAi | OPEM |

| STA | OPi | OPEj | |
|---|---|---|---|
| R | INi | $(k_i-1)$ DEG | FIi |

$k_i$

PROCESSOR SECURED AGAINST TRAPS

BACKGROUND OF THE INVENTION

1. Field of the Invention

The present invention relates to the field of processors executing series of instructions or operation codes on data.

The present invention more specifically relates to a processor used to execute a process of authentication, authorization or the like. More generally, the present invention applies to any program for which it is desired to guarantee that the execution (sequencing) of the program (instruction series) is not modified.

2. Discussion of the Related Art

In this type of application, a critical moment is when the processor must decide whether a specific operation is authorized. In an example of application to bank cards, this is, for example, the user authentication by means of the typed code, to allow a bank transaction.

To authorize or not access to a secure routine, the veracity of a condition is tested. According to the result of the test, access to the subsequent part of the process is authorized.

A weakness of such processes is linked to the risk of program traps, that is, of forcing the program to skip one or several instructions. Such a trap may be performed, for example, by sending a temporary current peak onto the processor supply for a short time (known as a "glitch"). A trap may be fraudulent or incidental. Attempts of fraudulent traps most often appear when the program has started a loop operation or is stopped on a blocking instruction, due to an authentication default.

Be there an incidental or intentional cause, a trap of a program executed by a processor is particularly disturbing when it is a security application.

The instruction sequencing is generally obtained by means of an instruction counter (called the program counter) associated with the program execution processor. Conventionally, to detect a trap attempt, the program counter rating the processor operation is doubled. By providing two program counters having different implementations and the respective outputs of which undergo a wired coherence test before starting the next instruction to be executed by the processor, some traps can be avoided. Indeed, on a current pulse attack, also known as a fault injection, there are great odds for the results provided by the two program counters to be different.

A disadvantage of this solution is that it is complex to implement.

SUMMARY OF THE INVENTION

The present invention aims at providing another solution for controlling the execution of instructions of a program executed by a processor.

The present invention more specifically aims at detecting an incoherent branching in the execution of a program.

The present invention also aims at providing a solution which does not require providing two separate program counters.

To achieve these and other objects, the present invention provides a method for controlling the execution of a program implementing M instructions, each comprising at least the execution of an operator selected from a set of N operators, comprising:

associating with each operator an initial digital code and a final digital code which are linked to each other by a degradation function applied a number of times depending on the execution of the operator;

applying to the content of a register initialized at each instruction beginning by the initial code of the corresponding operator said degradation function a number of times depending on the operator execution; and checking, at least at each instruction end, the coherence between the register content and the final code of the corresponding operator.

According to an embodiment of the present invention, the initial and final codes of the operators are stored in a read-only non-volatile memory.

According to an embodiment of the present invention, upon each execution of a program instruction, the method comprises:

reading the initial code associated with the operator of the instruction from said memory;

storing this initial code in said register;

applying said degradation function to the content of said register a number of times depending on the instruction type; and at the end of an instruction:

reading the final code associated with the operator of the instruction from said memory; and checking the coherence between the register content and this final code.

According to an embodiment of the present invention, the number of applications of the degradation function depends on the number of time cycles necessary to execute the instruction.

According to an embodiment of the present invention, the number of applications of the degradation function depends on the number of state switchings of a state automaton upon execution of the instruction.

According to an embodiment of the present invention, the initial and final codes associated with each operator are chosen so that two instructions executing different operators never share a same code, be it at the initial or final state or at an intermediary state by application of the degradation function.

According to an embodiment of the present invention, the degradation function is chosen so that each state is separated from the next state by a Hamming distance.

According to an embodiment of the present invention, the detection of a current code contained in the register, different from an initial or final key, causes a specific anomaly processing.

The present invention also provides a processor for executing a program, associated with a register for storing a current binary key for controlling the program execution.

The foregoing objects, features and advantages of the present invention, will be discussed in detail in the following non-limiting description of specific embodiments in connection with the accompanying drawings.

DETAILED DESCRIPTION

Figures 1, 2, 3:
FIG. 1 illustrates the content of a memory for storing initial and final keys associated with each operator according to an embodiment of the method for securing against traps of a program according to the present invention.
FIG. 2 illustrates features of a program of the type to which the present invention applies.
FIG. 3 illustrates the execution of an instruction of a program according to an embodiment of the present invention.

The same elements have been designated with the same references in the different drawings. For clarity, only those elements and steps that are necessary to the understanding of the present invention have been shown in the drawings and will be described hereafter. In particular, the operators involved in the implementation of the present invention have not been detailed, the present invention applying whatever the type of operators. Further, none of the components necessary to the execution of a program, be it by means of a software implementation or by means of a wired logic state machine, has been detailed, since their construction uses conventional elements.

A feature of the present invention is to associate, with each instruction operator of a program to be executed by means of a processor, two keys or binary words which are linked to each other by a so-called degradation function, depending on the execution of this instruction. A first key corresponds to a so-called initial key. The second key corresponds to a so-called final key, that is, to the result reached by the degradation function at the end of the involved instruction.

The instruction is here distinguished from the operator, in that an instruction comprises an operator and, most often, operands. As is known an instruction counter or program counter sequences the program progress, each instruction requiring a number of cycles which depends on the operator and on the number of operands associated therewith. Further, in the program execution, a state automaton takes successive states according to the operands and results. The number of states taken by the automaton during an instruction may be different from the number of instruction cycles. According to the present invention, the degradation function is applied either on a time basis, at the rate of the instruction cycles or clock cycles, or on a space basis at the rate of the state switchings of the state automaton.

Another feature of the present invention is to use a single binary word representing the current key submitted to the degradation function along the program execution. In other words, a register of storage of a binary key, the value of which changes, for example, for each cycle of the program counter, and some states of which are known and predetermined, is used. These are the initial and final states of the keys associated with each operator used by the program.

The role of the degradation function is to modify the value contained in the key register, from the initial operator key, knowing that after the number of applications linked to this operator, the register must contain the final key. This is true in the context of a normal operation, that is, with no attempt of incidental or voluntary trap.

FIG. 1 very schematically illustrates the structure of a memory 1, or of an area of the read-only memory (ROM), for storing the initial and final keys associated, according to the present invention, to the different types of operators used in a program.

A table in which, with each operator OPi (i ranging between 1 and N, where N represents the number of possible operator types in the program), are associated an initial value INi and a final value Fli of the key characteristic of the present invention is stored. The size of the words stored in memory 1 depends on number N of operator types likely to be used in the program, as well as on the maximum number (as an alternative, the average number) of intermediary states taken by the key, by application of the degradation function, during an instruction.

FIG. 2 illustrates in the form of a table the features of a program and, more specifically, instructions of a program which are useful for the implementation of the present invention.

The program comprises M instruction lines INSTj (j ranging between 1 and M). Each line PgLine is identified by the operator (OPCode) OPi of the instruction and the set of operands (OPE) OPEj used by the operator. The operators have been designated by index i (ranging between 1 and N), since two different lines of the program may use a same operator with a different set of operands (for example, the loading or the reading of data at an address according to the operand associated with the operator). Each operator OPi has as characteristics (in addition to initial and final keys INi and Fli specific to the present invention) a number $k_i$ of instruction cycles (CyNb) or of clock cycles, a number of states of the state automaton (not shown) and a number SAi of operands (OPENb). In FIG. 2, an implementation of the present invention is assumed on the number of cycles of the program counter, whereby the number of states of the state automaton is not taken into account.

FIG. 3 illustrates, by the successive contents of state automaton STA and of a key register R characteristic of the present invention, the execution of an instruction INSTj of a program according to an implementation mode of the present invention.

State automaton STA successively contains operator OPi, then the states of the operands of set OPEj of instruction INSTj. Upon loading of operator OPi into automaton STA, the corresponding key INi is extracted from table 1 (FIG. 1) and is loaded into register R as the initialization value.

Taking as an example a degradation of the key of register R at each cycle of the instruction counter, the key is submitted $k_i$−1 times degradation function DEG (which is the same whatever the operator). At the end of the $k_i$−1th degradation, the value contained in register R is, in the absence of a trap, Fli.

In the case (not shown) where the degradation function is applied on the basis of the state switchings of automaton STA, it is applied a number a times corresponding to the number of state switchings associated with operator OPi, but one.

Each time the CPU or the processor identifies an instruction beginning, it checks the coherence of the specific register R of the present invention with the initial key INi associated with the corresponding operator and stored in table 1. In practice, the processor knows that it is a new instruction by an instruction load signal that it receives. If the value contained in the key register corresponds to key INi associated with the operator, it is proceeded to the next step of the instruction which, unless SAi=0, corresponds to the exploitation of an operand.

At the end of a current instruction, the CPU compares the content of register R with final key Fli associated with the involved operator. In the case of a coherence between the two values, the program execution is continued by proceeding to the next instruction. If not, an error function is executed, for example, a program stop.

The simplest degradation function is the increment by one, that is, adding value 1 to each successive content of register R. Any other degradation function may be envisaged, as will be seen hereafter.

Figure 4:
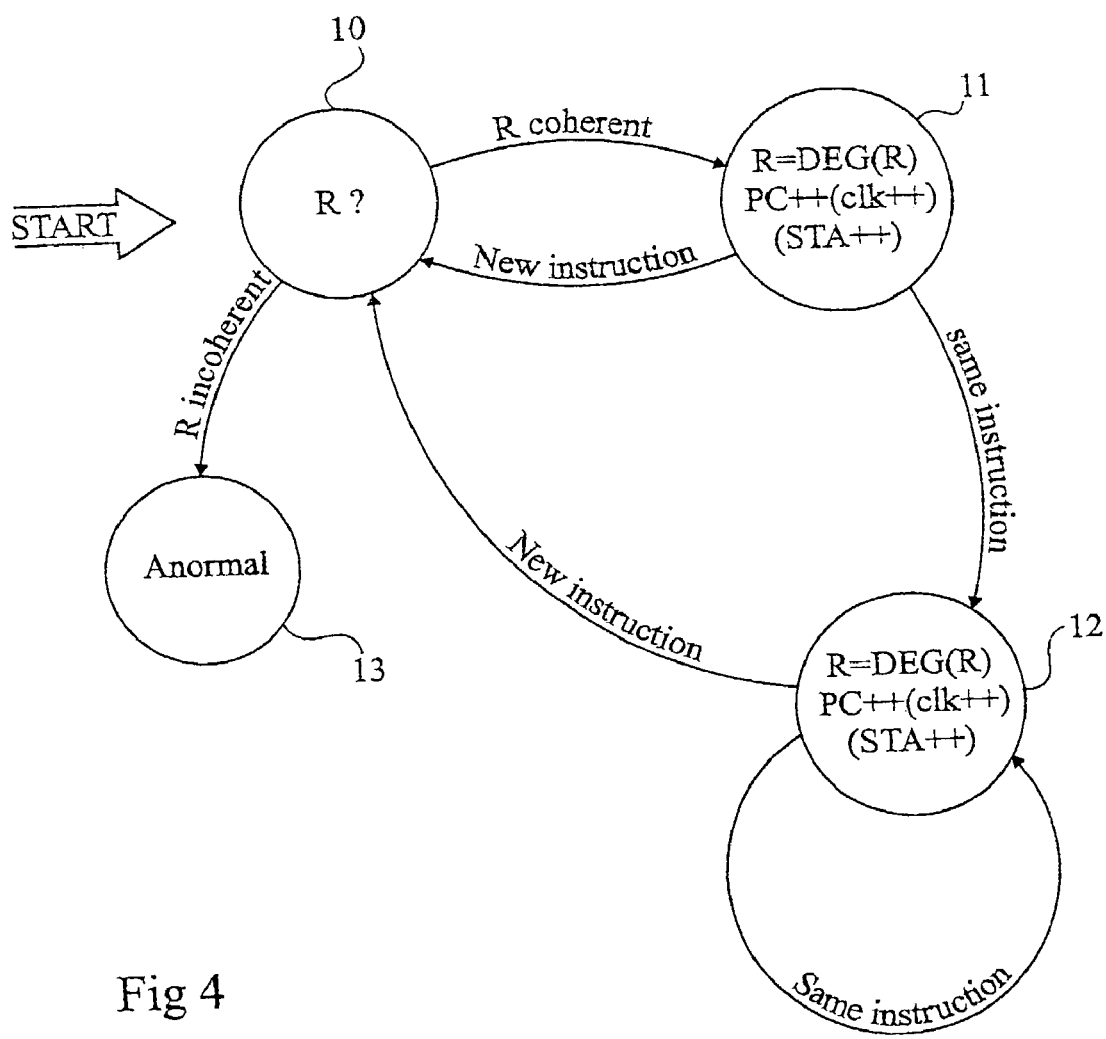
FIG. 4 is a state diagram illustrating an implementation mode of the present invention.

FIG. 4 shows a state diagram of an implementation mode of the present invention. At the beginning (START) of the program execution, the coherence (state 10) of the content of register R with the initial key of the involved operator is optionally checked.

In case of an identity (R coherent), degradation function DEG is applied to the register content (state 11). This amounts to replacing the content of register R with a degraded value (R=DEG(R)). Then, the program counter, or as an alternative, the clock, or a state counter, is incremented (PC++, or CLK++, or STA++), to proceed to the next program step.

If this step corresponds to an intermediary state of the instruction, that is, stays within the same instruction of the program, the degradation function is reapplied (state 12) to the value contained in register R, and the program counter, for example, is incremented again (state 12). As long as it is remained within the same instruction, it is looped on this state 12 for each increment of the program counter (as an alternative, of the clock or of the state counter).

When arriving at the end of the instruction, the coherence of the content of register R is checked (state 10) with respect to the final key FIi of the corresponding instruction. If the content of register R actually corresponds to the final state FIi, this means that the instruction has been normally executed (with no trap). In case of an incoherence between the content of register R and the initial or final key of the current operator, a specific error processing is executed (state 13, Abnormal).

Then, if there remain instructions INSTj in the program, register R is reset with the initial key of the new instruction.

For each new instruction, register R will be loaded with the value of initial code INi of operator OPi stored in the memory (table 1, FIG. 1). The initial loaded value is then degraded along the execution of the instruction, to reach, normally, final value FIi.

In the case where a trap attempt occurs, be it incidental or voluntary, the program counter is modified. Accordingly, the executed instruction will either stop if the trap leads to the first step of a new instruction, or carry on on the basis of another operand.

In the first case, the survey of the content of the register corresponding to an instruction end does not provide the expected value. In the second case, the processing carries on by applying the degradation function to the number of remaining cycles (or states) until the end of the instruction is reached. However, the number of degradations really applied to the initial key does not correspond to the number associated with the operator. Accordingly, the final key will be different from that expected.

Preferably, the number of incoherent states generated by the degradation function is a function of the duration of the instructions. Assuming a set of N instructions, there are 2*N coherent keys. Noting AVG the average duration in number of cycles of an instruction, the number of incoherent keys is equal to AVG*N. The same line of reasoning may apply to the number of states of the state automaton if the present invention is based on its state switchings.

The system reliability especially depends on the distance (interval) between keys, be they coherent or incoherent, of each operator. In fact, the final incoherent key of a given operator must be as distant as possible from the first coherent key of another operator.

The system security thus rests upon the fact that if the processor undergoes a trap during the processing of an instruction (be it in a coherent state or not at that time), it can never come back across a coherent key. For this purpose, the following conditions must preferably be respected.

First, the keys of a given operator OPi must be unique. Two instructions of different types will thus never share a same key, be it coherent or incoherent. Further, according to a preferred implementation, to prevent a switching from any final state to any initial state of an operation, each couple of initial and final keys must be separated by a minimum number of applications of the degradation function, which is a function of the number of cycles necessary between the two states. This condition is a minimum condition. Indeed, a degradation function and codes constructed in such a way that it can never be passed from one code to another by the application of the degradation function may be used.

According to a preferred embodiment, the size of register R containing the key depends on degradation function DEG. More specifically, it must not be possible to pass from final state FIN of the last operator OPN to initial state IN1 of the first operator OP1, by application of the degradation function, by taking advantage of a register overflow. Accordingly, it will be ascertained that final state FIN of the last operator OPN (provided that it corresponds to the greatest key) is also separated by at least the average number of cycles AVG from the maximum content of the register.

An advantage of the present invention is that it ensures the detection of a trap of a program, be it incidental or voluntary.

Another advantage of the present invention is that its implementation is compatible with any set of instructions.

Of course, the present invention is likely to have various alterations, modifications, and improvement which will readily occur to those skilled in the art. In particular, any degradation function may be selected, provided that it respects the functional conditions indicated hereabove. For example, reference may be made to work "The Theory of Error Correcting Codes", by F.J. Macwilliams and N.J.A. Sloane, published in 1977 by ELSEVIER SCIENCE PUBLISHER BV in the collection of North-Holland Mathematical Library, which is incorporated herein by reference to select the degradation function. As a specific example, a function respecting, between two states, a so-called Hamming distance which respects all the functionalities indicated hereabove will be selected.

Further, the practical implementation of the present invention is within the abilities of those skilled in the art based on the functional indications given hereabove. Indeed, these indications suffice to the programming of the steps necessary to the execution of the provided controls. Moreover, for the implementation in the form of a wired-logic state machine, the transposition is also within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for controlling the execution of a program implementing M instructions, each comprising at least the execution of an operator selected from a set of N operators, comprising:

associating with each operator an initial digital code and a final digital code which are linked to each other by a degradation function applied a number of times depending on the execution of the operator;

applying, to an initial register content, initialized at each instruction beginning with the initial digital code of the corresponding operator said degradation function a number of times depending on the operator execution to create an end register content; and checking, at least at each instruction end, the coherence between the end register content and the final digital code of the corresponding operator for correct execution of each instruction, wherein the end register content is not equal to the initial register content and coherence exists between the end register content and the final digital code.

2. The method of claim 1, wherein the initial digital code and the final digital code of the operators are stored in a read-only non-volatile memory.

3. The method of claim 2, wherein upon each execution of a program instruction, the method comprises:
   reading the initial digital code associated with the operator of the instruction from said memory;
   storing the initial digital code in said register;
   applying said degradation function to the content of said register a number of times depending on the instruction type; and
   at the end of an instruction:
      reading the final digital code associated with the operator of the instruction from said memory; and
      checking the coherence between the register content and the final digital code.

4. The method of claim 1, wherein the number of applications of the degradation function depends on the number of time cycles necessary to execute the instruction.

5. The method of claim 1, wherein the number of applications of the degradation function depends on the number of state switchings of a state automaton upon execution of the instruction.

6. The method of claim 1, wherein the initial digital code and the final digital code associated with each operator are chosen so that two instructions executing different operators never share a same code, be it at an initial or final state or at an intermediary state by application of the degradation function.

7. The method of claim 1, wherein the degradation function is chosen so that each state is separated from the next state by a Hamming distance.

8. The method of claim 1, wherein the detection of a current digital code contained in the register, different from an initial digital code or final digital code, causes a specific anomaly processing.

9. A processor for executing a program, associated with a register for storing a current binary key for controlling the program execution by application of the method of claim 1.

10. A method for controlling the execution of a program implementing M instructions, each comprising at least the execution of an operator selected from a set of N operators, comprising:
   associating with each operator an initial digital code and a final digital code which are linked to each other by a degradation function applied a number of times depending on the execution of the operator;
   applying, to an initial register content, initialized at each instruction beginning with the initial digital code of the corresponding operator said degradation function a number of times depending on the operator execution to create an end register content;
   checking, at least at each instruction end, the coherence between the end register content and the final digital code of the corresponding operator for correct execution of each instruction, wherein the end register content is not equal to the initial register content and coherence exists between the end register content and the final digital code; and
   wherein the initial digital code and the final digital code associated with each operator are chosen so that two instructions executing different operators never share a same code, be it at an initial or final state or at an intermediary state by application of the degradation function.

* * * * *